Dec. 30, 1941.  S. C. LEONARD, JR  2,267,931
SEAL
Filed May 20, 1940

Inventor
SIMPSON C. LEONARD, Jr.
By his Attorney

Patented Dec. 30, 1941

2,267,931

UNITED STATES PATENT OFFICE 2,267,931

SEAL

Simpson C. Leonard, Jr., Detroit, Mich.

Application May 20, 1940, Serial No. 336,098

1 Claim. (Cl. 288—3)

This invention relates to an oil seal of the type adapted to be inserted in a housing or the like in encompassing relation to a part to be sealed such as a centrally located shaft.

An object of the invention is to provide an oil seal which is inexpensive to manufacture, easy to assemble and one in which the packing member is securely held in its housing in fluid tight sealing engagement with a centrally located shaft.

Another object of the invention is to provide a molded hardened plastic member which is clamped to a packing member by crimping a metallic member over the adjacent ends of the plastic packing members.

Other objects of the invention will be more apparent from the following description taken in connection with the accompanying drawing, in which.

Figure 1:
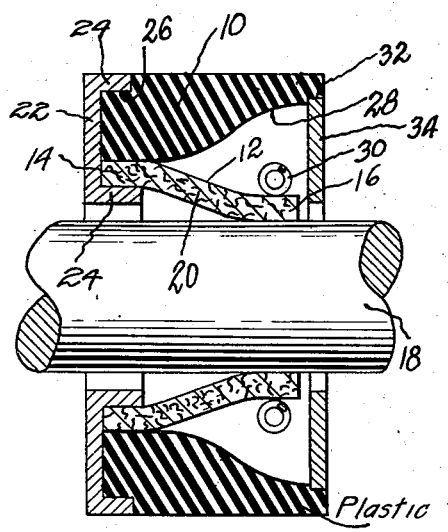
Fig. 1 is a transverse sectional view showing one embodiment of the invention.
Figure 2:
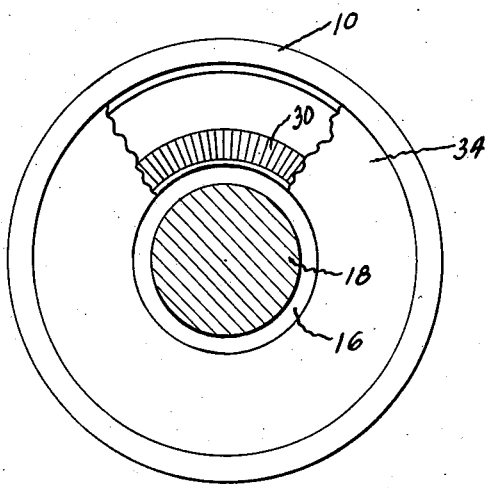
Fig. 2 is an end view of Fig. 1, parts being broken away and in section.

Referring to the drawing, I have shown an annular block of hardened plastic material 10. A pliable packing member 12, of substantially cylindrical formation, has one end thereof provided with an annular portion 14 which is of larger diameter than its opposite end portion 16, the latter being adapted for sealing engagement with a centrally located shaft 18. The two end portions are integrally connected by a diagonally extending portion 20.

The outer periphery of the packing member 12 is held in sealing engagement with the inner periphery of the hardened plastic material 10 by a channel sheet metal stamping 22, the axially extending flange 24 thereof being pressed into holding engagement with the outer and inner peripheries of the members 10 and 12, respectively. An annular groove 26 is provided in the hardened plastic member 10 for receiving the outer axially extending flange 24.

The inner periphery of the hardened plastic member 10 at the opposite side thereof is cut away as shown at 28 to provide a space for an annular tension spring 30 surrounding the reduced diameter portion 16 of the packing 12, which spring serves to urge the packing member 12 into sealing engagement with the shaft 18.

A counterbore 32 is provided in the plastic material at the end opposite the channel member 22 for the reception of a press-fitted washer 34 which serves to close the end of the assembly and also to retain the spring 30 in its position on the packing member 12.

Figure 3:
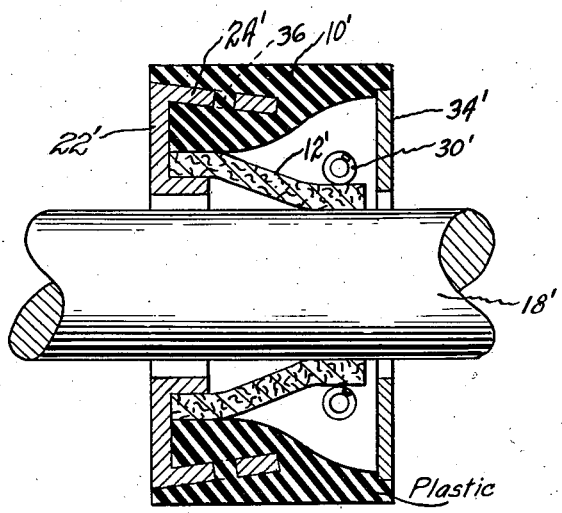
Fig. 3 is a view corresponding to Fig. 1 showing a modification of the invention.

In the form of the invention shown in Fig. 3, the channel member 22' is shown having its outer axially extending flange 24' embedded in the plastic material 10', the latter being molded around the flange 24'. The flange 24' is provided with a plurality of apertures 36 for receiving the plastic material to more firmly hold the parts together.

When assembling, the inner axially extending flange is bent into the axial position shown, thereby pressing the packing tightly against the inner periphery of the plastic material 10'.

Various changes, including the size, shape and arrangement of parts, may be made without departing from the spirit of the invention and it is not my intention to limit the scope thereof other than by the terms of the appended claim.

What I claim is:

An oil seal comprising a substantially cylindrical packing member having one end offset radially inwardly relative to its opposite end and having a smaller diameter than the opposite end for sealing engagement with a centrally located shaft, an annular ring of molded hardened plastic material having its inner periphery in engagement with the outer periphery of the larger end of said packing material, a channel-shaped stamping having a radially extending flange and parallel axially extending flanges, one of said axially extending flanges being embedded in said hardened plastic material and the other of said axially extending flanges in sealing engagement with the inner periphery of said packing member at one end thereof, a washer press-fitted in said hardened plastic material at the opposite end thereof, and a tension spring surroundng the smaller diameter flange of said packing member.

SIMPSON C. LEONARD, Jr.